United States Patent [19]

Lian

[11] Patent Number: 4,790,552
[45] Date of Patent: Dec. 13, 1988

[54] CHILDREN'S CABLE DRIVEN MINI-CAR

[76] Inventor: Hong R. Lian, 2F, No. 479, An-Leh Road, Yung Heh City, Taipei Hsien, Taiwan

[21] Appl. No.: 115,904

[22] Filed: Nov. 2, 1987

[51] Int. Cl.$^4$ .......................... B62L 3/02; B62M 1/04
[52] U.S. Cl. ....................................... 280/230; 74/322; 192/3.52; 280/1.206; 280/237; 280/238; 280/251; 296/186; 301/124 H; 446/465; D12/83; D21/71
[58] Field of Search ...................... 280/1.11 R, 1.11 A, 280/1.12, 1.13, 1.206, 29, 200, 210, 212, 219, 236, 237, 238, 253, 255, 282, 230, 251; 180/70.1; 296/177, 185, 186; 192/3.52, 3.53; 301/124 H; 74/501.5, 322, 323, 505, 506, 512, 491; 446/465; 188/2 R; D21/71; D12/83

[56] References Cited

U.S. PATENT DOCUMENTS

| | | | |
|---|---|---|---|
| 941,407 | 11/1909 | Cox | 192/3.53 |
| 1,368,696 | 2/1921 | Butterfield | 280/1.11 R |
| 1,659,517 | 2/1928 | Cornil | 280/1.11 R |
| 3,232,369 | 2/1966 | Holloway | 280/1.11 R |
| 4,709,958 | 12/1987 | Harrod | 296/177 |

FOREIGN PATENT DOCUMENTS 174680 7/1921 United Kingdom ............... 192/3.52

*Primary Examiner*—David M. Mitchell
*Assistant Examiner*—Everett G. Diederiks, Jr.
*Attorney, Agent, or Firm*—Leonard Bloom

[57] ABSTRACT

A children's mini-car includes a three-gear set disposed on a rear axle. The three-gear set, which is driven by the ropes disposed on both sides of the rear axle, is arranged to cooperate with accelerator pedals located on both sides of a front transverse rod to alternatively drive the rear wheels to move the mini-car forward. In addition, a gear shifting lever is used to control the gear set, so as to reverse the direction of movement of the mini-car with the aid of a rear view mirror. Furthermore, a detachable car seat can be removed from the mini-car and a steering wheel can be replaced by a movable pedal, such that the instant mini-car may act as a safe children's sliding car by utilizing an auxiliary brake system located below the steering wheel.

7 Claims, 12 Drawing Sheets

4,790,552

CHILDREN'S CABLE DRIVEN MINI-CAR

FIELD OF THE INVENTION

The present invention relates to a mini-car and, more particularly, to a multi-purpose children's mini-car which may act as both a mini-car and a sliding car.

BACKGROUND OF THE INVENTION

In a conventional children's mini-car, a pedal is arranged to directly cross the main body of the car in order to directly drive the car to move forward. However, when reversing the car, the driver has to change both the pedaling direction and the hand's orientation. Therefore, it is difficult to control the backward direction of the aforesaid mini-car. In addition, the conventional mini-car usually lacks an auxiliary brake mechanism to control its speed, so that the driver has to brake the car by contacting his feet with ground. This is quite inconvenient and may adversely affect the mood of the driver.

SUMMARY OF THE INVENTION

It is, therefore, an object of the present invention to obviate and mitigate the above-mentioned drawbacks.

It is the primary object of the present invention to provide a children's mini-car which comprises a pair of square groove shafts which are respectively secured to both ends of a rear axle of said mini-car, such that said square groove shafts are associated with a specific gear set and cooperate with a gear shifting lever to reverse the direction of movement of said mini-car. In addition, said mini-car further comprises a rear view mirror to facilitate movement in the reverse direction.

It is another object of the present invention to provide a children's mini-car which comprises a pair of pull ropes disposed on each of the protective frames which are respectively secured to both lateral edges of the rear axle, such that said pull ropes can be driven by a pair of accelerator pedals to force the mini-car forward. The wheels of the mini-car are separately driven by said accelerator pedals associated with said pull ropes. Therefore, this arrangement may facilitate the control of the reverse movement and of the left/right turn of the instant mini-car.

It is a further object of the present invention to provide a children's mini-car which may act as a sliding car by removing a detachable rear seat as well as a detachable backrest from same or act as a horse-car by changing the outlook of the appearance.

It is still a further object of the present invention to provide a children's mini-car which comprises an auxiliary brake system that is secured to the middle of a front transverse rod, wherein said auxiliary brake system may provide a brake effect by pressing a steering wheel downward. Furthermore, a brake pedal adjacent to the accelerator pedal is used to brake the instant mini-car.

DETAILED DESCRIPTION OF THE PREFERRED EMBODIMENT

Figure 1:
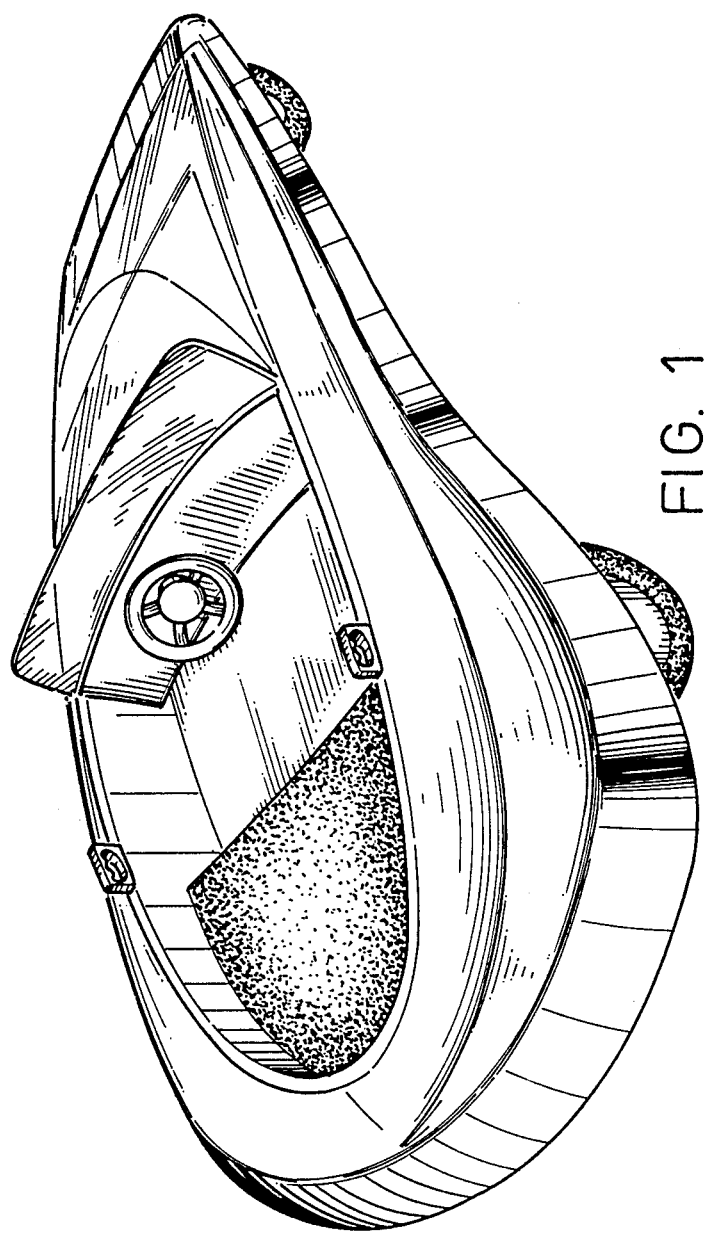
FIG. 1 is a perspective view of a preferred embodiment of the present invention.

FIG. 1 shows a preferred embodiment of the present invention. However, it is appreciated that the appearance of the instant invention can be modified as desired.

Figure 2:
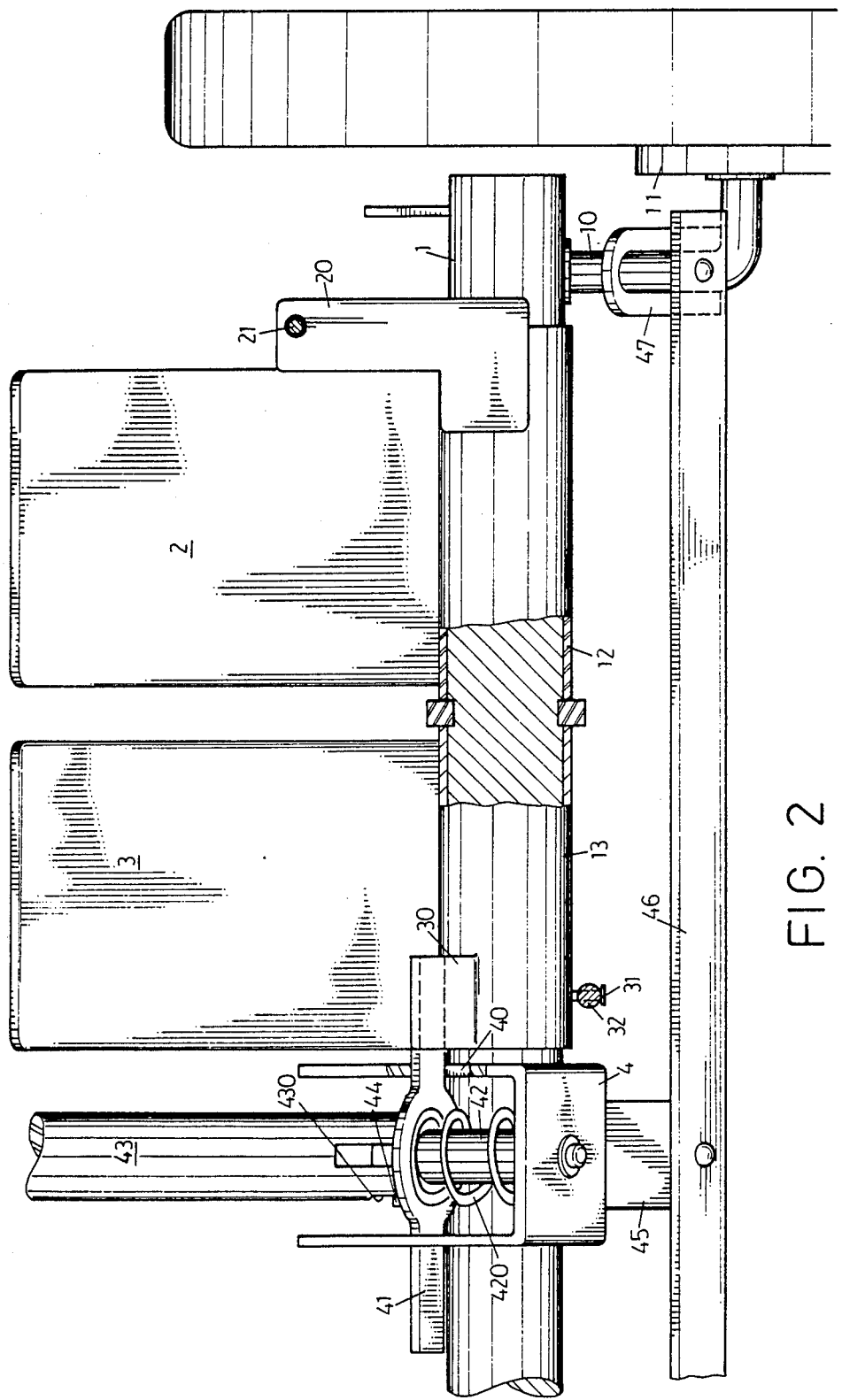
FIG. 2 is a schematic view showing the arrangement of a front transverse rod of the present invention.

FIG. 2 is a schematic view showing the arrangement of a front transverse rod as well as the relevant components. The front transverse rod (front axle) 1 is supported on a front hub 11 by a pair of rotatable L-shaped rods 10 each of which is disposed on a respective side of said front transverse rod 1. The middle of the front transverse rod 1 is provided with a U-shaped frame 4 to which an auxiliary brake system is secured. The front transverse rod 1 is furnished on both ends with a pair of rod members (sleeves) 12 and 13. The rod member 12 is formed at its rear edge with an accelerator pedal 2 mounted thereon and extending outwardly therefrom. The other rod member 13 is furnished at its rear edge with a brake pedal 3 mounted thereon and extending outwardly therefrom. A pull rope fixing plate 20 is disposed on the front edge of the rod member 12 to cooperate with the reciprocating motion of the accelerator pedal in order to intermittently draw the pull rope. The front edge of the rod member 13 has a flat plate 30 and the lower portion thereof is provided with a rib 31 to which a brake stick 32 can be mounted.

The U-shaped frame 4 is provided at both sides with pair of openings 40 through which an auxiliary brake piece 41 is disposed having the respective ends protruding therefrom. Both protruding ends of the piece 41 are arranged to directly lie on a respective flat plate 30. The brake piece 41 has a central hole (aperature) formed therein through which a rotatable supporting column 42 passes. The top edge of said supporting column is directly inserted into the steering wheel sleeve 43 where it is received. The bottom edge of the sleeve 43 is arranged to press on the brake piece 41. The side wall of the sleeve 43 is formed with a key slot 430 which locks the supporting column 42 in position by means of a position key 44 and limits the travel of the sleeve 43. A spring 420 is disposed surrounding the supporting column 42 and between the brake piece 41 (about the central hole thereof) and the bottom of the U-shaped frame 4. A link member 45 has one end that is clamped between the supporting column 42 and the U-shaped frame 4 and another opposite end that is connected with a guide plate 46. Both ends of the guide plate 46 is secured to a respective L-shaped rod 10 by means of a respective link member 47, so as to control the left/right turning movement of the front wheels. The top edge of the sleeve 43 is connected to a steering wheel 48 which rotates the supporting column 42, thereby controlling the left/right displacement of the guide plate 46, so as to adjust the orientation of the front wheels for effectuating turns and other maneuvers.

Figure 3:
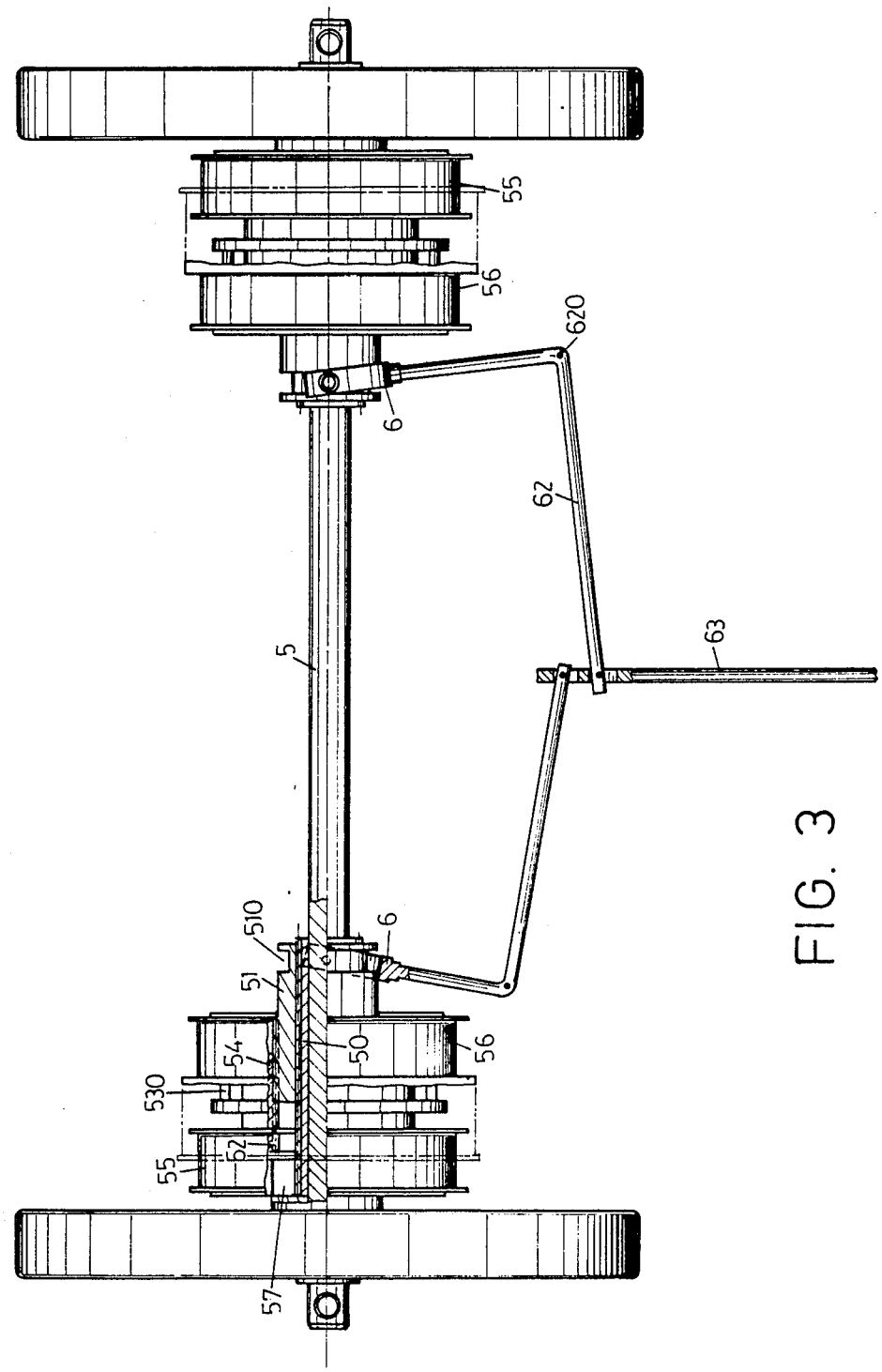
FIG. 3 is a front view of a rear axle of the present invention.
Figures 4, 4A:
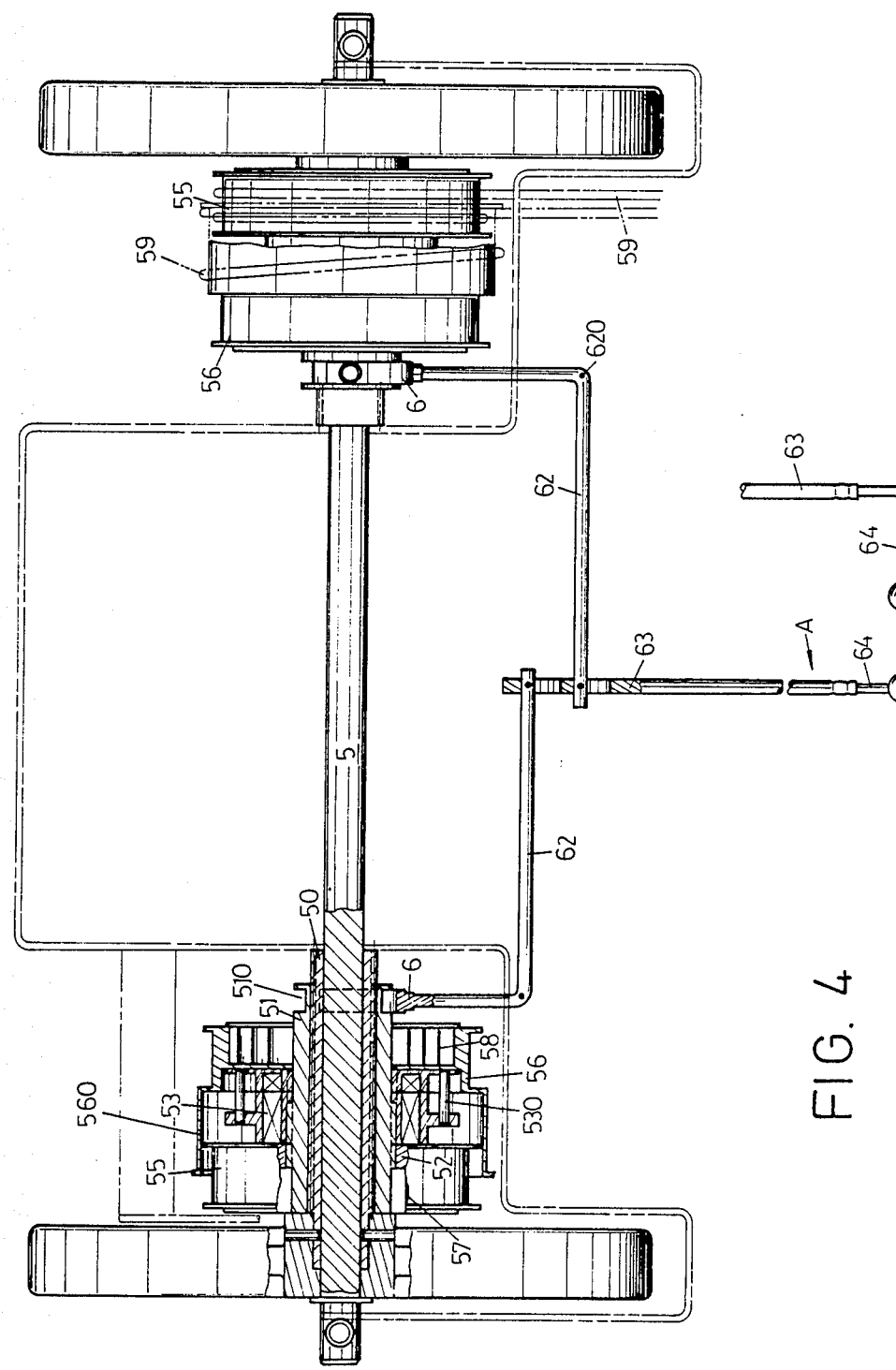
FIG. 4 is a top plan view of the rear axle shown in FIG. 3.
FIG. 4A is a side view of FIG. 4.

Referring to FIGS. 3 and 4, a rear axle mechanism comprises a rear axle 5 to support a pair of rear wheels. A pair of square groove shafts (toothed gear shafts) 50, each of which is adjacent to a respective inner side of each rear wheel, is properly disposed on the rear axle 5 in order to guide the transverse displacement of the double-sided gear (rotational toothed transmission gear) 51. The rear axle 5 is further provided with a pair of three-gear sets, each of which are supported by a respective pair of outer and inner protective frames 55 and 56. A spring resilient means for reversing the rotation of the first frame 57, adjacent to each of the respective rear wheels is disposed on each of the outer protective frames (first rotational frame) 55 and a forward inner gear 52 is located at the lateral side of each respective spring 57. Each inner protective frame (second rotational frame) 56 has at its outer side a spring (resilient means for reversing the rotation of the second frame) 58 (as shown in FIG. 4) and a backward inner gear 54 which is opposite to a respective said forward inner gear 52 and which is disposed on the same side of the spring 58 as the forward inner gear 52. A respective idle gear 53 is located between each pair of said protective frames 55 and 56, such that the respective supporting arms thereof extend outward therefrom supporting a respective pair of said two inner gears and connecting with a respective pair of said two protective frames. The design of each of the supporting arms synchronously rotates a respective three-gear set. In addition, the tooth width of the double-sided gear is designed to correspond to the sum of the width of any two of the three gears in each of the said gear sets. That is, the teeth of each of the double-sided gears is arranged to engage (mesh) with the teeth of both the idle gear 53 and one of the inner gears 52 or 54 of a respective gear set in order to support said idle gear.

Referring again to FIGS. 4 and 5, one end of each of said springs 57 and 58 is connected with a respective fixing pin 74 and 75, respectively, and the other end of each spring 57 and 58 is joined with one of the respective frames 55 and 56, such that the springs can be compressed as said inner and outer protective frames are driven to rotate. Each of the outer protective frames 55 is wound around its periphery with a respective cable (first and second drive cables) 59 and each of the respective inner protective frames 56 has a ring-shaped 560 portion which is wound with another cable 59. The cables 59 are secured at a first end to the frames. The winding direction of said cables with respect to each pair of the corresponding protective frames are opposite to each other because the rotating direction (first forward and second reverse) of said protective frames of each pair are different. Said two cables of each frame pair intersect at a proper location below the bottom plate of the car. A cable segment of each respective pair of intersecting cables extends upward from said intersection (now shown) to connect with one of a pair of handles 90 disposed on each side of the car. Each of the cables 59 is further connected at a second end with a respective pull rope fixing plate 20 such that when the fixing plate 20 is actuated, the inner and outer protective frames 55 and 56 can be rotated in either the first forward or the second reverse direction via the aid of the pull rope 21 and the cables 59, so as to twist the springs 57 and 58. At this instant, the inner gears 52 and 54 respectively disposed in the protective frames can, in turn, be rotated, in such a manner that the rear wheels can be driven to move either forward or backward depending on the location of the double-sided gear as aforesaid. That is to say, the (teeth of) inner gear, which does not engage (mesh) with the (teeth of) double-sided gear, will be in null rotation (the force will not be transmitted) with the idle gear. The springs 57 and 58 are used to draw (resiliently return or reverse the rotation of) the inner and outer protective frames, and to rewind the cable 59 and the pull rope 21 back to their original positions for next ready use. It is noted that the rotating directions of each set of two inner gears 52 and 54 are opposite to each other. In view of this fact, we see that the power transmission of the instant case is independent, such that this arrangement can facilitate left/right turning movement of the car within a small space. Furthermore, since the motion of said springs is intermittent, the power provided by said springs is limited, so that the car is provided with a brake system which can further ensure the security of the car.

Figure 5:
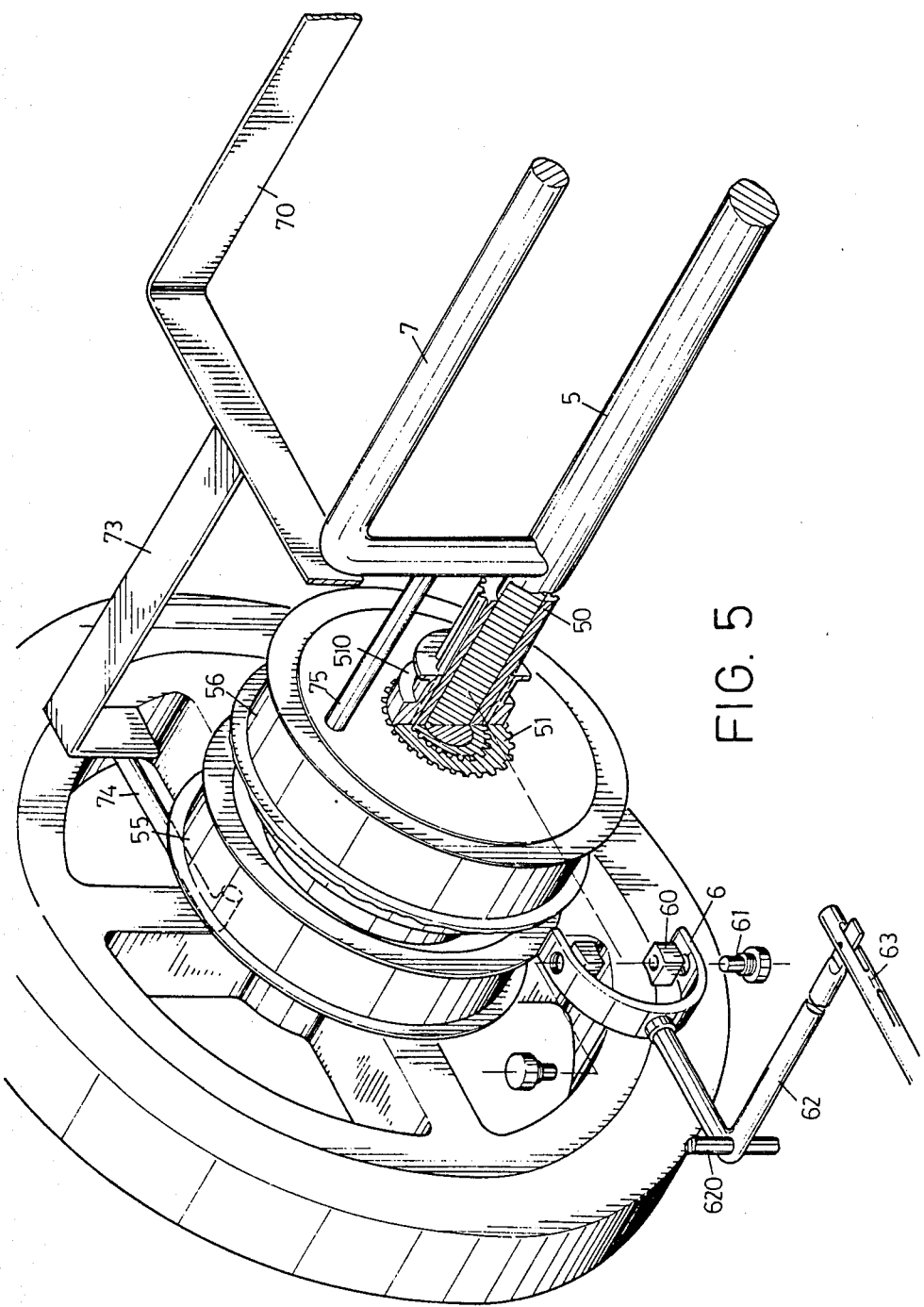
FIG. 5 is a partial perspective view illustrating a reverse mechanism of the present invention.

Referring to FIGS. 4 and 5, means for transversely, slidably moving the gears 51 is shown. Each of the double-sided gears 51 is arranged to cooperate (mesh) with a respective inner gear 52 and idle gear 53, so that when the respective accelerator pedal 2 associated therewith is actuated, the rear wheels will be forced forward. Each of the double-sided gears 51 is provided with a respective recess 510 which receives a respective Y-shaped frame 6 therein. A pair of arcuate slidable blocks 60 are secured to each of the respective Y-shaped frames 6 and are received in a respective recess 510 (as shown in FIG. 5). Each block 60 is fixed to a respective frame 6 by means of a screw 61 to allow each of the respective double-sided gears 51 to freely rotate. A pair of L-shaped links 62 connects each of the frames with a straight rod 63. The corner (elbow) of each of the L-shaped links 62 has a pin 620 which is secured to the bottom plate of the car. The straight rod 63 extends along the car body to a predetermined location and then extends upward to connect with the handle 64 (as shown in FIG. 4A). An E-shaped guide slot is arranged to correspond to the handle 64. Guide slot is used to hold the handle 64 in its current position. The guide slot can be formed in any position in which a child can easily hold reach and hold. When the handle is engaged with the front edge of the E-shaped guide slot, the straight rod 63 will be forced forward by the lever effect provided by the fixing pin 620, such that each of the Y-shaped frames 6 may force the double-sided gears 51 secured thereto to move along a respective shaft 50 to engage (mesh) with the tooth of a respective backward inner gear 54. Meanwhile, each of the respective double-sided gears 51 still maintains its engagement (meshing engagement) with a respective idle gear 53. At this instant, each of said pair of two protective frames 55 and 56 can be simultaneously actuated when the accelerator pedal 2 is forced forward. However, the power is provided by the respective pair of inner protective frames 56 and the forward inner gears associated therewith are in a null rotation state wherein they neither mesh nor engage with one another.

Figure 6:
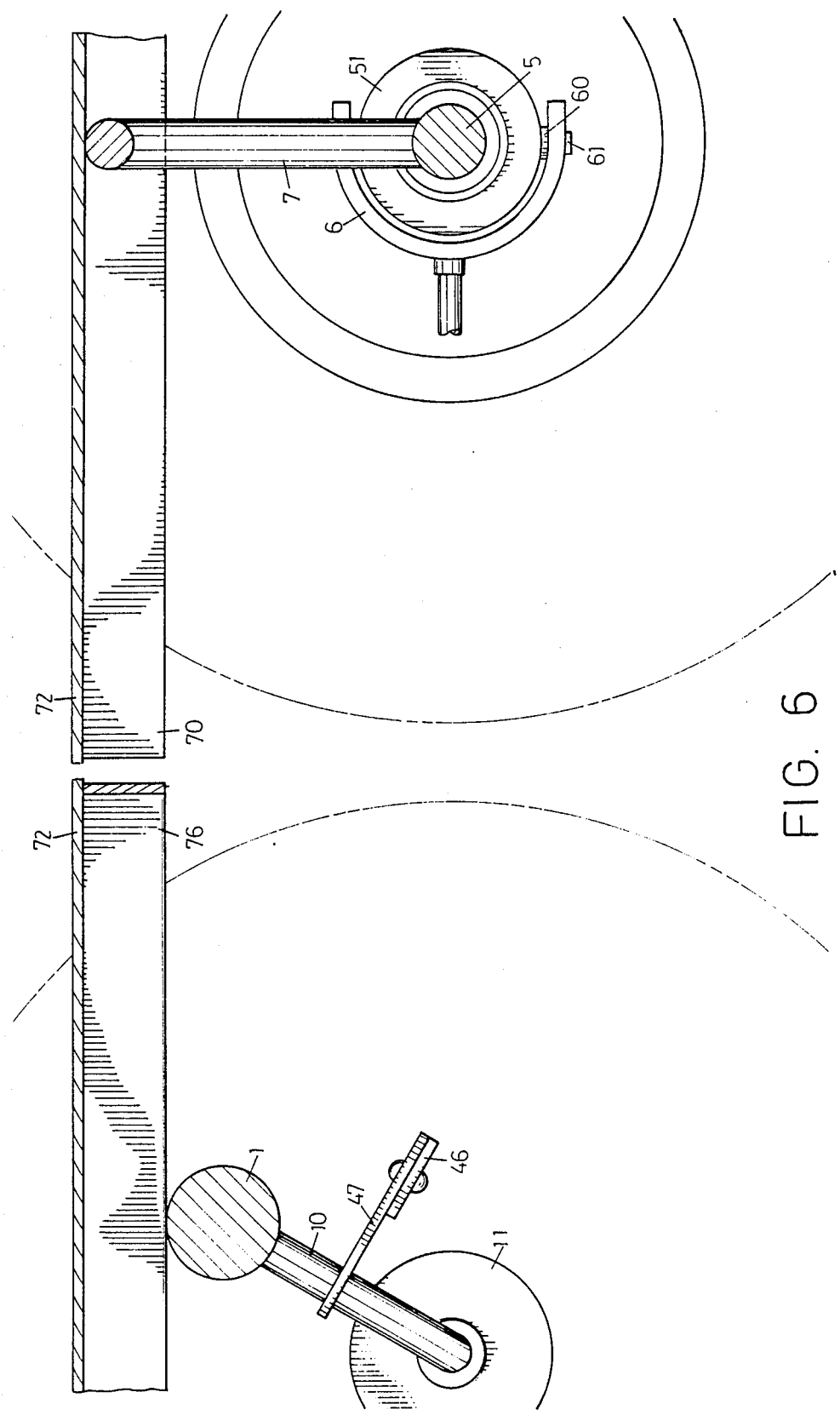
FIG. 6 is a side view of a bottom plate of the car in accordance with the present invention.

Referring to FIGS. 5 and 6, a U-shaped frame 7 is mounted on the rear axle 5 and located between the inner edges of the square groove shaft 50. A rectangular frame 70 is supported by a supporting frame 71 and said rectangular frame 70 is used to support the bottom plate of the car. The rectangular frame 70 is provided at both ends thereof with a pair of L-shaped cover plates 73. Each of the plates 73 connects with the fixing pin 74 which is secured to the spring 57 disposed in the outer protective frame 55. The fixing pin 75 is used to secure the spring 58 together with the front transverse rod 1 to a proper position outside the pull rope fixing plate 20. A side frame 76 is provided to support the bottom plate 72 of the car.

Figure 7:
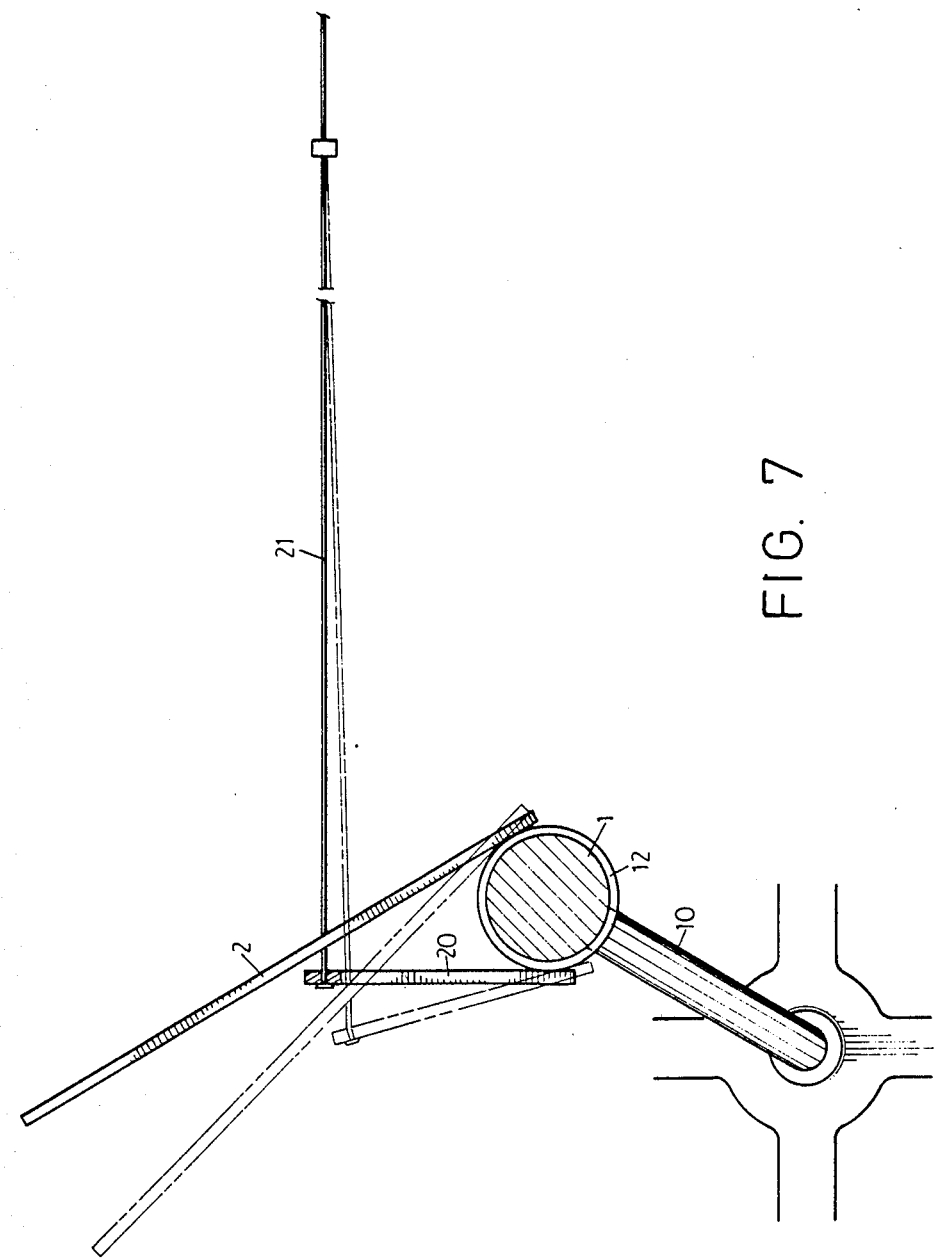
FIG. 7 is a schematic view showing the motion of an accelerator pedal of the present invention.

Referring to FIG. 7, when the accelerator pedal 2 is forced forward, the rod member 12 is rotated to force the pull rope fixing plate 20 forward in the first forward direction, such that the pull rope 21 and the cable 59 associated therewith are, in turn, drawn to rotate the relevant protective frame, as well as the forward inner gear. In this way, the spring is twisted so as to move the car forward. When the accelerator pedal 2 is released, the compressed spring can force (resiliently return) said pedal back to its original position.

Figure 8:
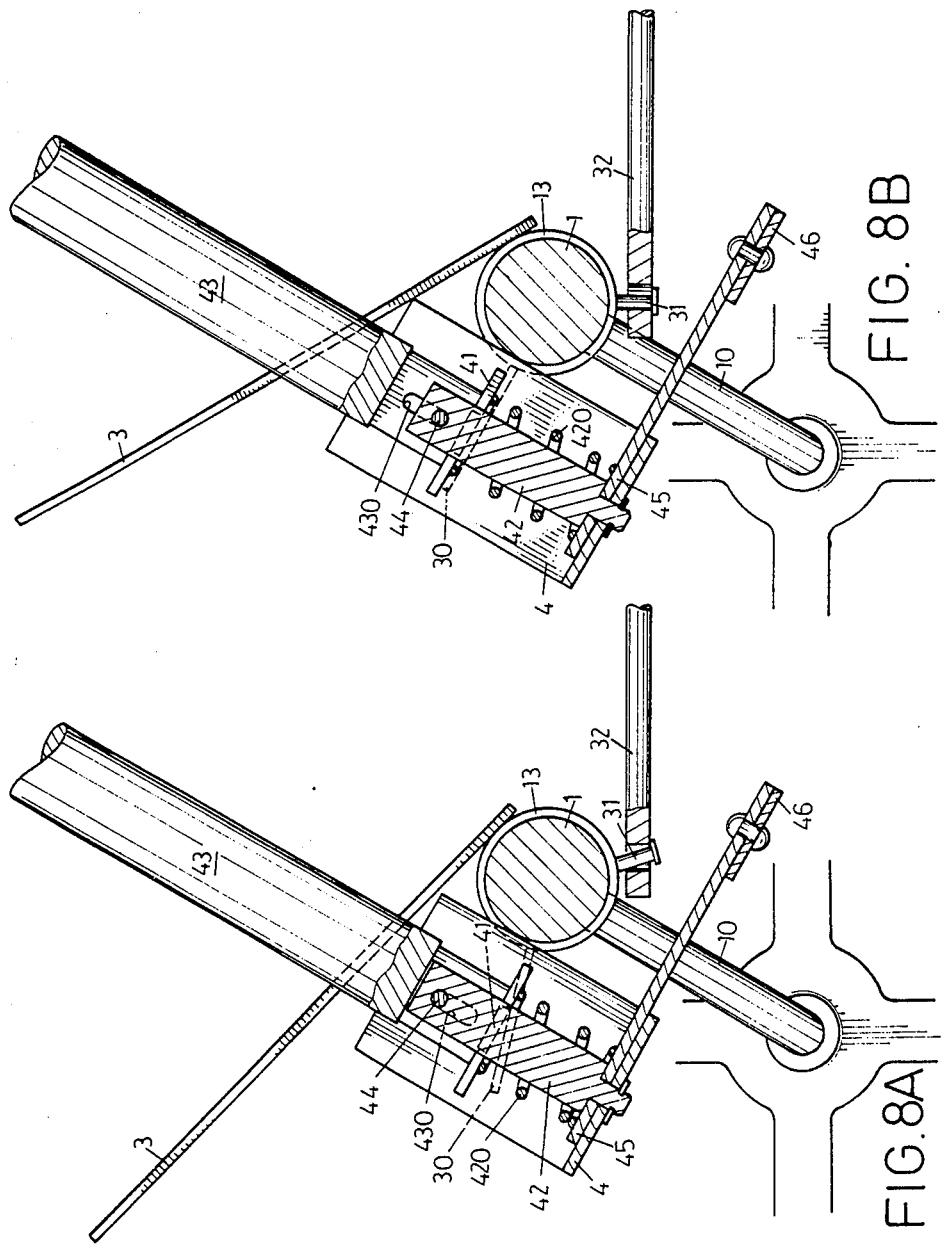
FIGS. 8A and 8B are schematic views shown the motion of an auxiliary brake system of the present invention.
Figure 9:
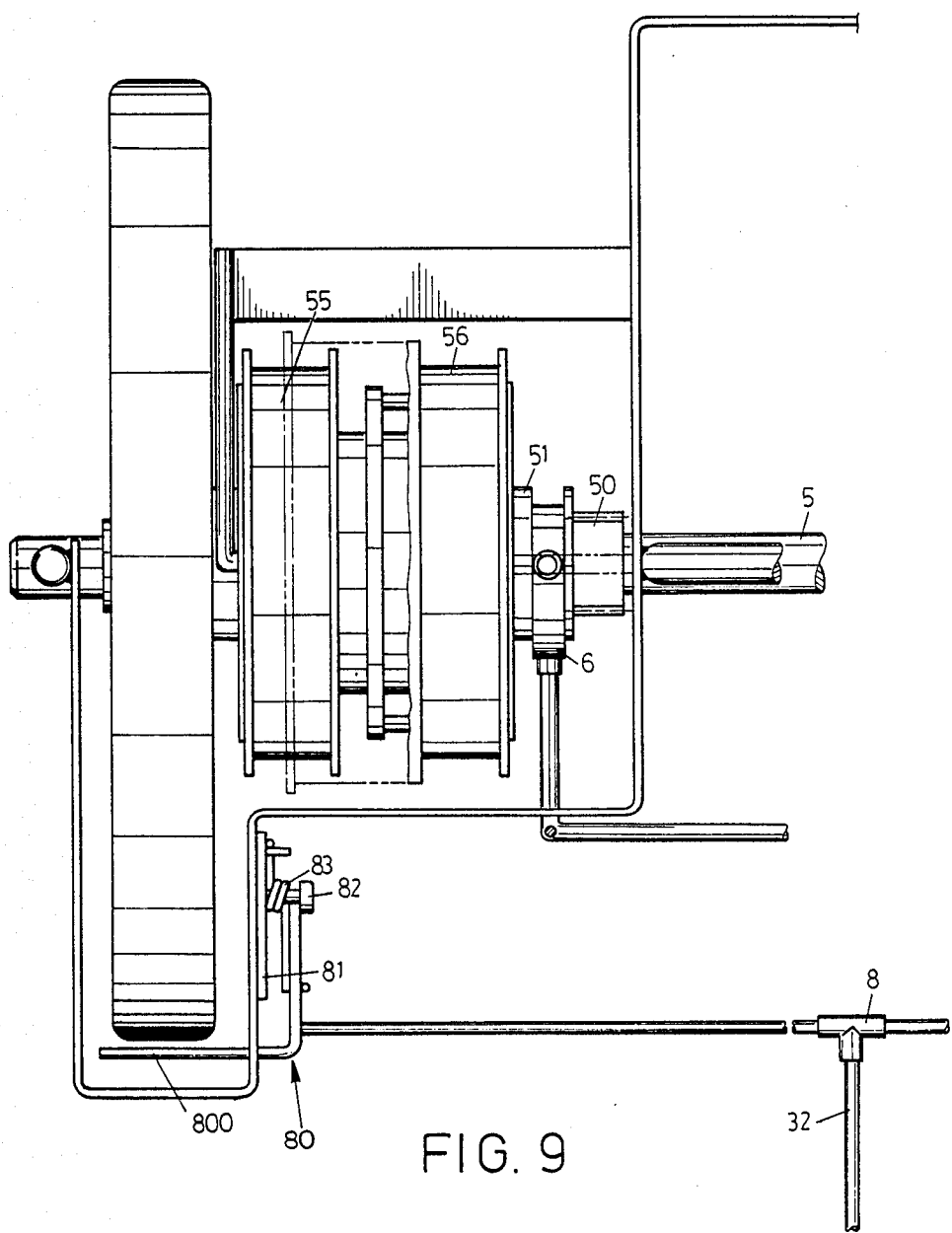
FIG. 9 is a schematic view showing the motion of a brake system of the present invention.

Referring to FIGS. 8A and 8B and 9, when a brake pedal 3 is forced forward, the rod member 13 is rotated to force the flat plate 30 downward and to force the rib 31 backward. Meanwhile, the rib 31 drives the brake stick 32 backward. The brake stick 32 is connected at its end with a two-way connector 8 which has at both ends thereof a respective brake transverse rod 80. The brake transverse rod 80 is divided into two parts at a predetermined location wherein one horizontal part 800 thereof is aligned with and spaced from the rear wheel and the other part thereof is secured to a bolt 82 that is mounted to a lateral base plate 81 of the car. A spring 83 is disposed on the bolt 82 in such a manner that when the brake stick 32, together with the two-way connector 8 are forced backward, the horizontal part 800 of the brake transverse rod 80 will be slightly forced in an inwardly direction to both compress the spring and brake the wheels. When the brake pedal 3 is released the rod member 13 and associated link members can return to their original positions with the aid of the spring 83.

Figure 10:
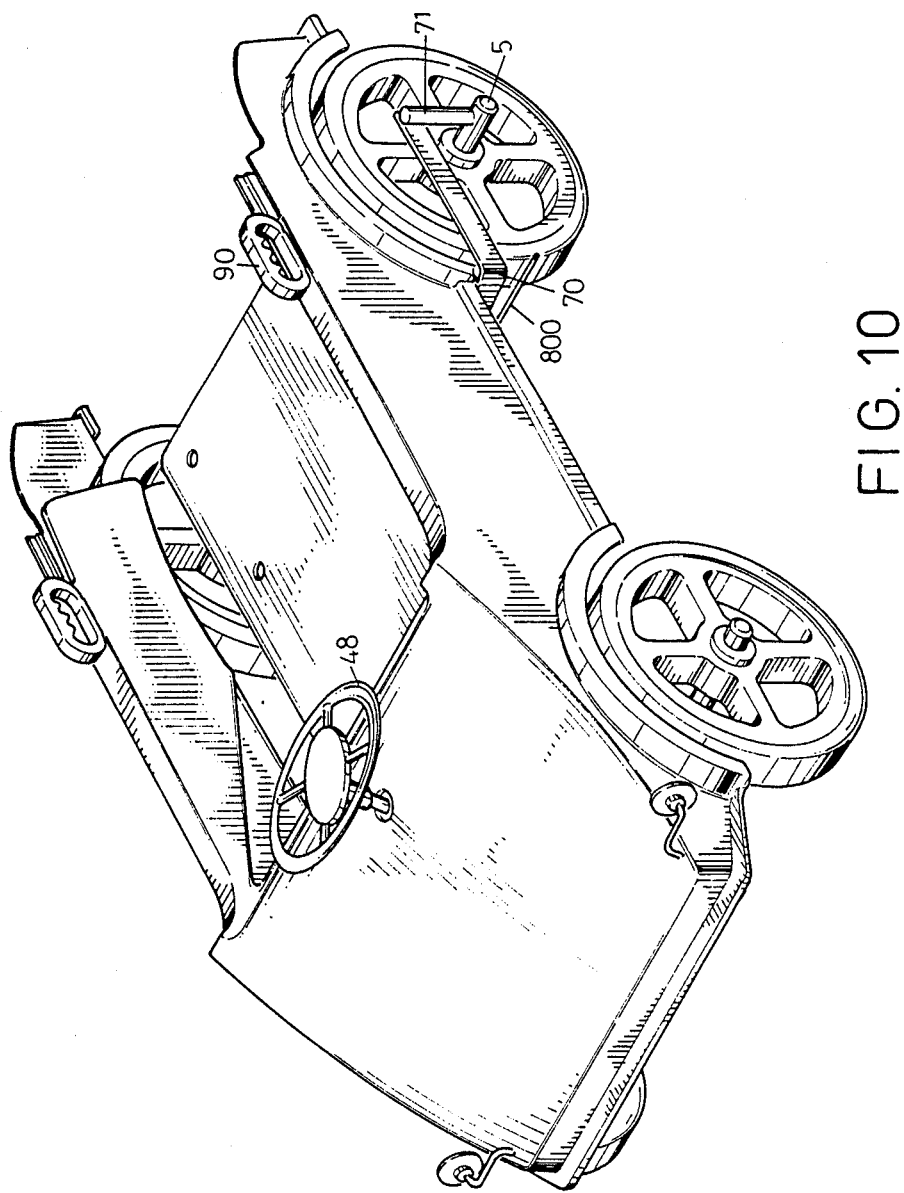
FIG. 10 is a perspective view of the present invention wherein the instant case acts as a further embodiment of a car.

FIGS. 8A and 8B shows an auxiliary brake system for the instant mini-car when it is being utilized as a sliding car by removing a rear seat therefrom (as shown in FIG. 10). In this case, the auxiliary brake system can be directly controlled by the steering wheel 48 in the following manner: Firstly, the steering wheel sleeve 43 is pressed downward, driving the brake piece 41, so as to force the flat plate 30 downward. Then, the rod member 13 can be rotated to force the rib 31 backward, such that the brake stick 32 may provide a similar brake effect as mentioned above. When the steering wheel 48 is released, the spring 83 forces the rod member 13 to return to its original position and the spring 420 below the brake piece 41 forces the brake piece 41 as well as the sleeve 43 to return their original positions.

Figure 11:
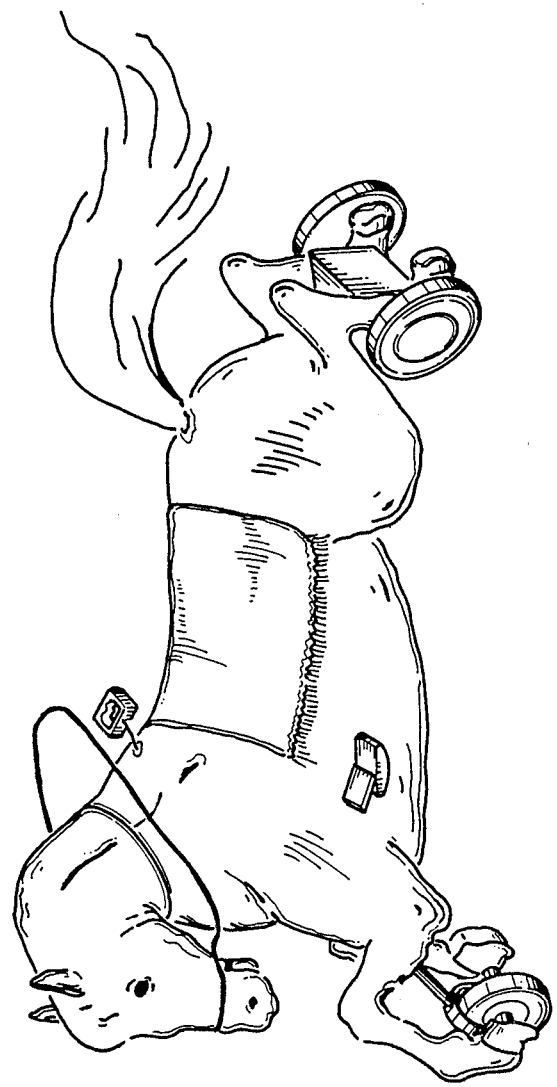
FIG. 11 is a perspective view of a further preferred embodiment of the present invention.

Referring to FIG. 11, the present invention is shaped as a horse wherein the rear feet thereof are provided with a pair of larger wheels through which a rear axle passes. The construction of said rear axle is similar to that described in FIG. 1 and therefore it will not be repeated herein. A pair of footboards adjacent to both sides of the horse body are connected with the brake stick 32 disposed in the interior of the horse body. Pedaling any one of said two footboards may brake the overall motion of the horse. A pair of reins are disposed on the horse neck. A transverse rod is mounted on the respective ends of said two reins to facilitate the left-/right turning movement of the horse. The front feet of the horse are connected to a wheel to facilitate the motion of the horse.

Figure 12:
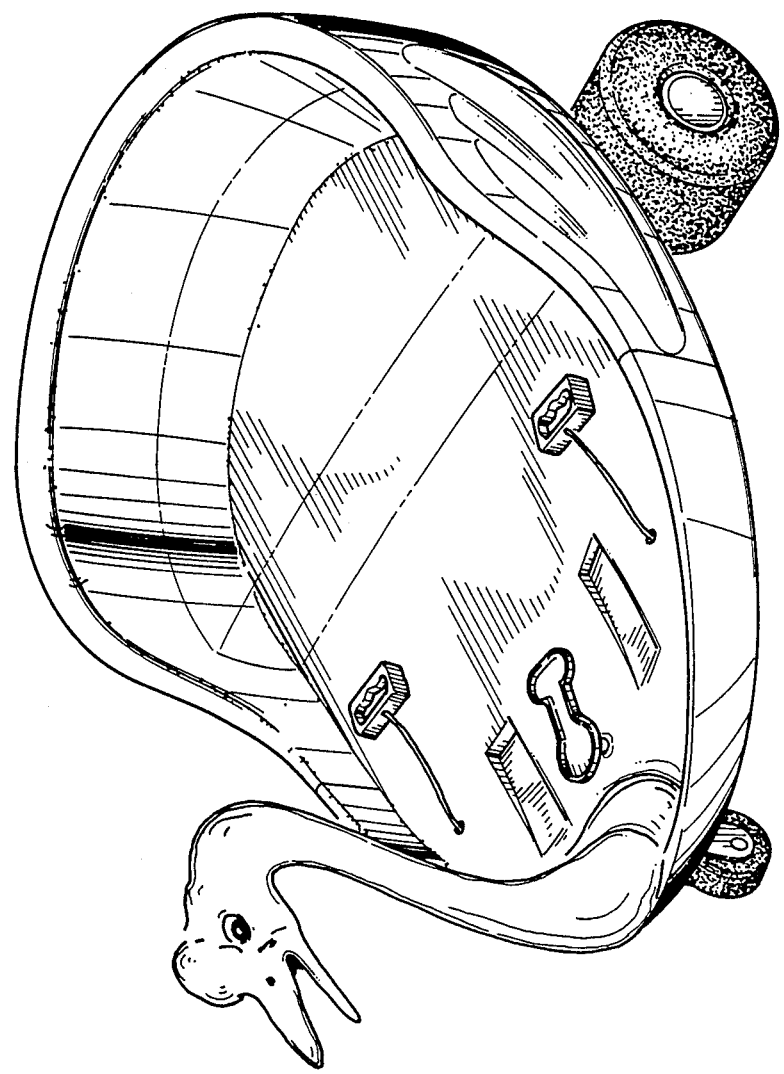
FIG. 12 is a perspective view of still a further preferred embodiment of the present invention.

FIG. 12 illustrates a swan-shaped children's mini-car wherein a pair of brake pedals are disposed on the front of a seat. The left/right turning movement of the mini-car can be controlled by pedaling the brake pedals. A pair of cables are designed to be drawn by the children to increase the motion speed. It may also as a sliding car by removing the rear seat (as shown in dotted line).

I claim:

1. A children's mini-car comprising:
a front transverse rod having a pair of ends, a pair of inner and outer sleeves being symmetrically rotatably received externally on each end of the front transverse rod, a brake system means for stopping movement of the mini-car, a rotational rear axle having a pair of ends, a respective toothed gear shaft being secured to each of the ends of the rear axle so as to link each end of the rear axle to a corresponding rear wheel, a pair of double-sided gears, each double-sided gear being disposed on a respective toothed gear shaft in such a manner that said double-sided gear can transversely, slidably move along said toothed gear shaft, said double-sided gear being formed at one side with a recess, a gear shifting link mechanism being disposed between said front transverse rod and said rear axle, said link mechanism being secured to each respective double-sided gear for selectively, transversely, slidably moving said double-sided gear, said front transverse rod being supported on a pair of front hubs by a pair of L-shaped supporting rods, each of which is connected to a respective end of said front transverse rod, a frame being disposed on said front transverse rod to support a bottom plate of the car, each of said outer sleeves having a respective accelerator pedal mounted thereon and extending outwardly therefrom for concomitant rotational movement therewith, and a respective pull rope fixing plate mounted thereon and extending outwardly therefrom for concomitant rotational movement therewith, each of said inner sleeves further being furnished with the brake system means a pair of three gear sets, each gear set including a respective forward inner gear, backward inner gear and idle gear, each of said gear sets being disposed between a respective pair of inner and outer protective frames, each of said outer protective frames being provided at the outer side thereof with a respective spring and at the inner side thereof with one of the respective forward inner gears, each of said inner protective frames being provided at the outer side thereof with a spring and at the inner side thereof with one of the respective backward inner gears, a respective idle gear being located between each of the respective pairs of said forward inner gears and said backward inner gears of each of the three gear sets, each of said idle gears being formed at both sides with a respective pair of supporting arms by which each of said idle gears is supported on both of the respective inner gears of each of the three-gear sets and the respective inner and outer protective frames between which each of the respective three-gear sets and the pair of protective frames between which it is disposed synchronously rotate, the double-sided gear further having a width corresponding to the sum of the width of any two of the forward inner gear, backward inner gear and idle gear of a respective three-gear set, such that sliding movement of the double-sided gear by the link mechanism engages one of either the said forward inner gear and the idle gear or the backward inner gear and the idle gear, so that rotational movement thereof is transferred to the toothed gear shaft and the rear axle via the double-sided gear, each of said springs being secured at a respective one end thereof to a respective corresponding outer protective frame and the respective other ends thereof being secured to said rear axle, each of said respective springs being locked to its position by a respective fixing pin, a respective pair of cable being disposed on each respective pair of inner and outer protective frames, the winding directions of said two cables of each respective pair being opposite to each other, said two cables intersecting and secured to each other at a predetermined location below said bottom plate of the car and said secured cables being further connected with a pull rope which is secured to a respective pull rope fixing plate, such that when said accelerator pedal is rotated forwardly, the respective sleeve and the pull rope fixing plate mounted thereon are rotated forwardly therewith and, said inner and outer protective frames are rotated via the rotation of said outer sleeves associated with one of the respective pull rope fixing plates which pulls said pull rope and said cables, so as to twist said springs and further unwinding the cables from the protective frames, thereby rotating, respectively, the frames, the three-gear set disposed therein, the double-sided gear, the toothed gear shaft, the rear axle and the wheels carried thereon, such that the power resulting from movement of the accelerator pedal and/or the fixing plate is transferred to move said rear wheels forward or backward depending on the engagement location of said double-sided gear.

2. A children's mini-car comprising:
a front transverse rod having a pair of ends; a pair of inner and outer sleeves being received on each end of the front transverse rod, a brake system means for stopping movement of the mini-car; a rotational rear axle having a pair of ends; a respective toothed gear shaft being secured to each of the ends of the rear axle, so as to link each end of the rear axle to a corresponding rear wheel; a pair of double-sided gears, each double-sided gear being disposed on a respective toothed gear, in such a manner that said double-sided gear can transversely, slidably move along said toothed gear shaft, said double-sided gear being formed at one side with a recess; a gear shifting link mechanism being disposed between said front transverse rod and said rear axle; said link mechanism being secured to each respective double-sided gear for selectively, transversely, slidably moving said double-sided gear; said front transverse rod being supported on a pair of front hubs by a pair of L-shaped supporting rods, each of which is connected to a respective end of said front transverse rod; a frame being disposed on said front transverse rod to support a bottom plate of the car, each of said outer sleeves having a respective accelerator pedal mounted thereon and extending outwardly therefrom for concomitant rotational movement therewith and a respective pull rope fixing plate mounted thereon and extending outwardly therefrom for concomitant rotational movement therewith; each of said inner sleeves further being furnished with the brake system means; a pair of three-gear sets, each gear set including a respective forward inner gear, backward inner gear and idle gear; each of said gear sets being disposed between a respective pair of inner and outer frames, each of said outer protective frames being provided at the outer side thereof with a respective spring and at the inner side thereof with one of the respective forward inner gears; each of said inner protective frames being provided at the outer side thereof with a spring and at the inner side thereof with one of the respective backward inner gears; a respective idle gear being located between each of the respective pairs of said forward inner gears and said backward inner gears of each of the three gear sets, each of said idle gears being formed at both sides with a respective pair of supporting arms by which each of said idle gears is supported on both of the respective inner gears of each of the three-gear sets and the respective inner and outer protective frames between which each of the respective three-gear sets are disposed, such that each of the respective three-gear sets and the pair of protective frames between which it is disposed synchronously rotate; the double-sided gear further having a width corresponding to the sum of the width of any two of the forward inner gear, backward inner gear and idle gear of a respective three-gear set, such that sliding movement of the double-sided gear by the link mechanism engages one of either the said forward inner gear and the idle gear or the backward inner gear and the idle gear, so that rotational movement thereof is transferred to the toothed gear shaft and the rear axle via the double-sided gear; each of said springs being secured at a respective one end thereof to a respective other ends thereof being secured to said rear axle, each of said respective springs being locked to its position by a respective fixing pin; a respective pair of cables being disposed on each respective pair of inner and outer protective frames, the winding directions of said two cables of each respective pair being opposite to each other; said two cables intersecting and secured to each other at a predetermined location below said bottom plate of the car and said secured cables being further connected with a pull rope which is secured to a respective pull rope fixing plate, such that when said accelerator pedal is rotated forwardly, the respective sleeve and the pull rope fixing plate mounted thereon are rotated forwardly therewith and said inner and outer protective frames are rotated via the rotation of said outer sleeves associated with one of the respective pull rope fixing plates which pulls said pull rope and said cables, so as to twist said springs and further unwinding the cables from the protective frames, thereby rotating, respectively, the frames, the three-gear set disposed therein, the double-sided gear, the toothed gear shaft, the rear axle and the wheels carried thereon, such that the power resulting from the movement of the accelerator pedal and/or the pull rope fixing plate is transferred to move said rear wheels forward or backward depending on the engagement location of said double-sided gear; wherein the gear shifting link mechanism includes a Y-shaped frame having a pair of L-shaped links, each link having one end secured to a respective recess of said double-sided gear by a pair of arcuate slidable blocks each block being disposed on a respective one end of an L-shaped link and further being received in a respective recess wherein the said blocks are fixed by corresponding fasteners, said L-shaped links further having a second opposite end which is connected with a straight rod, each of said L-shaped links having at its corner a respective fixing pin which is secured to the bottom plate of the car, said straight rod extending upward from the L-shaped links and are connected to a handle, whereby when said handle is actuated, said Y-shaped frame can selectively drive the double-sided gear via the aid of a lever effect, such that said double-sided gear can either engage with or disengage from one of said forward and backward inner gears.

3. A children's mini-car as claimed in claim 2, wherein the width of said double-sided gear is arranged to correspond to the sum of the width of any two gears of the three-gear sets.

4. A children's mini-car comprising:
a front transverse rod having a pair of ends; a pair of inner and outer sleeves being received on each end of the front transverse rod, a brake system means for stopping movement of the mini-car; a rotational rear axle having a pair of ends; a respective toothed gear shaft being secured to each of the ends of the rear axle, so as to link each end of the rear axle to a corresponding rear wheel; a pair of double-sided gears, each double-sided gear being disposed on a respective toothed gear, in such a manner that said double-sided gear can transversely, slidably move along said toothed gear shaft, said double-sided gear being formed at one side with a recess; a gear shifting link mechanism being disposed between said front transverse rod and said rear axle; said link mechanism being secured to each respective double-sided gear for selectively, transversely, slidably moving said double-sided gear; said front transverse rod being supported on a pair of front hubs by a pair of L-shaped supporting rods, each of which is connected to a respective end of said front transverse rod; a frame being disposed on said front transverse rod to support a bottom plate of the car, each of said outer sleeves having a respective accelerator pedal mounted thereon and extending outwardly therefrom for concomitant rotational movement therewith and a respective pull rope fixing plate mounted thereon and extending outwardly therefrom for concomitant rotational movement therewith; each of said inner sleeves further being furnished with the brake system means; a pair of three-gear sets, each gear set including a respective forward inner gear, backward inner gear and idle gear; each of said gear sets being disposed between a respective pair of inner and outer frames, each of said outer protective frames being provided at the outer side thereof with a respective spring and at the inner side thereof with one of the respective forward inner gears; each of said inner protective frames being provided at the outer side thereof with a spring and at the inner side thereof with one of the respective backward inner gears; a respective idle gear being located between each of the respective pairs of said forward inner gears and said backward inner gears of each of the three gear sets, each of said idle gears being formed at both sides with a respective pair of supporting arms by which each of said idle gears is supported on both of the respective inner gears of each of the three-gear sets and the respective inner and outer protective frames between which each of the respective three-gear sets are disposed, such that each of the respective three-gear sets and the pair of protective frames between which it is disposed synchronously rotate; the double-sided gear further having a width corresponding to the sum of the width of any two of the forward inner gear, backward inner gear and idle gear of a respective three-gear set, such that sliding movement of the double-sided gear by the link mechanism engages one of either the said forward inner gear and the idle gear or the backward inner gear and the idle gear, so that rotational movement thereof is transferred to the toothed gear shaft and the rear axle via the double-sided gear; each of said springs being secured at a respective one end thereof to a respective corresponding outer protective frame and the respective other ends thereof being secured to said rear axle, each of said respective springs being locked to its position by a respective fixing pin; a respective pair of cables being disposed on each respective pair of inner and outer protective frames, the winding directions of said two cables of each respective pair being opposite to each other; said two cables intersecting and secured to each other at a predetermined location below said bottom plate of the car and said secured cables being further connected with a pull rope which is secured to a respective pull rope fixing plate, such that when said accelerator pedal is rotated forwardly, the respective sleeve and the pull rope fixing plate mounted thereon are rotated forwardly therewith and said inner and outer protective frames are rotated via the rotation of said outer sleeves associated with one of the respective pull rope fixing plates which pulls said pull rope and said cables, so as to twist said springs and further unwinding the cables from the protective frames, thereby rotating, respectively, the frames, the three-gear set disposed therein, the double-sided gear, the toothed gear shaft, the rear axle and the wheels carried thereon, such that the power resulting from the movement of the accelerator pedal and/or the pull rope fixing plate is transferred to move said rear wheels forward or backward depending on the engagement location of said double-sided gear; wherein said brake link mechanism includes a brake pedal mounted on one of the respective inner sleeves and extending outwardly therefrom for concomitant rotational movement therewith, a flat plate mounted on one of the respective inner sleeves and extending outwardly therefrom for concomitant rotational movement therewith, such that the application of force upon either one of the brake pedal or the flat plate rotates the sleeve and the other of said brake pedal or flat plate therewith, each inner sleeve having a respective bottom side being formed with a rib; a brake stick being connected at one end with said rib of said inner sleeve and at the other end with a two-way connector, which is furnished at both sides with a respective brake transverse rods, each brake transverse rod being divided into two parts in which one horizontal part thereof is aligned with and spaced from the rear wheel and the other part thereof is secured to a bolt mounted to a lateral base plate of the car, a spring being disposed on said bolt in such a manner that when said brake pedal is actuated, said horizontal part of said brake transverse rod can be forced to both brake the wheels and compress the spring via the aid of said rib, said brake stick and said two-way connector.

5. A children's mini-car comprising:
a front transverse rod having a pair of ends; a pair of inner and outer sleeves being received on each end of the front transverse rod, a brake system means for stopping movement of the mini-car; a rotational rear axle having a pair of ends; a respective toothed gear shaft being secured to each of the ends of the rear axle, so as to link each end of the rear axle to a corresponding rear wheel; a pair of double-sided gears, each double-sided gear being disposed on a respective toothed gear, in such a manner that said double-sided gear can transversely, slidably move along said toothed gear shaft, said double-sided gear being formed at one side with a recess; a gear shifting link mechanism being disposed between said front transverse rod and said rear axle; said link mechanism being secured to each respective double-sided gear for selectively, transversely, slidably moving said double-sided gear; said front transverse rod being supported on a pair of front hubs by a pair of L-shaped supporting rods, each of which is connected to a respective end of said front transverse rod; a frame being disposed on said front transverse rod to support a bottom plate of the car, each of said outer sleeves having a respective accelerator pedal mounted thereon and extending outwardly therefrom for concomitant rotational movement therewith and a respective pull rope fixing plate mounted thereon and extending outwardly therefrom for concomitant rotational movement therewith; each of said inner sleeves further being furnished with the brake system means; a pair of three-gear sets, each gear set including a respective forward inner gear, backward inner gear and idle gear; each of said gear sets being disposed between a respective pair of inner and outer frames, each of said outer protective frames being provided at the outer side thereof with a respective spring and at the inner side thereof with one of the respective forward inner gears; each of said inner protective frames being provided at the outer side thereof with a spring and at the inner side thereof with one of the respective backward inner gears; a respective idle gear being located between each of the respective pairs of said forward inner gears and said backward inner gears of each of the three gear sets, each of said idle gears being formed at both sides with a respective pair of supporting arms by which each of said idle gears is supported on both of the respective inner gears of each of the three-gear sets and the respective inner and outer protective frames between which each of the respective three-gear sets are disposed, such that each of the respective three-gear sets and the pair of protective frames between which it is disposed synchronously rotate; the double-sided gear further having a width corresponding to the sum of the width of any two of the forward inner gear, backward inner gear and idle gear of a respective three-gear set, such that sliding movement of the double-sided gear by the link mechanism engages one of either the said forward inner gear and the idle gear or the backward inner gear and the idle gear, so that rotational movement thereof is transferred to the toothed gear shaft and the rear axle via the double-sided gear; each of said springs being secured at a respective one end thereof to a respective corresponding outer protective frame and the respective other ends thereof being secured to said rear axle, each of said respective springs being locked to its position by a respective fixing pin; a respective pair of cables being disposed on each respective pair of inner and outer protective frames, the winding directions of said two cables of each respective pair being opposite to each other; said two cables intersecting and secured to each other at a predetermined location below said bottom plate of the car and said secured cables being further connected with a pull rope which is secured to a respective pull rope fixing plate, such that when said accelerator pedal is rotated forwardly, the respective sleeve and the pull rope fixing plate mounted thereon are rotated forwardly therewith and said inner and outer protective frames are rotated via the rotation of said outer sleeves associated with one of the respective pull rope fixing plates which pulls said pull rope and said cables, so as to twist said springs and further unwinding the cables from the protective frames, thereby rotating, respectively, the frames, the three-gear set disposed therein, the double-sided gear, the toothed gear shaft, the rear axle and the wheels carried thereon, such that the power resulting from the movement of the accelerator pedal and/or the pull rope fixing plate is transferred to move said rear wheels forward or backward depending on the engagement location of said double-sided gear; further including an auxiliary brake system including a steering wheel sleeve, a brake piece, a spring and a U-shaped frame, said U-shaped frame being secured to the front edge of the middle of said front transverse rod, said U-shaped frame being provided at both sides with a pair of openings to which a brake piece can be secured, both protruding ends of said piece being arranged to directly lie on said flat plate, said brake piece having a central hole through which a supporting column passes, said supporting column being inserted into said steering wheel sleeve, the bottom edge of said sleeve being arranged to press on said brake piece, a spring being disposed below said brake piece whereby when said steering wheel sleeve is forced downward to drive said brake piece associated with said flat plate to move downward, said inner sleeve is rotated to force said rib backward, such that said brake stick may provide a brake effect, and said brake piece further may compress said spring, such that when said steering wheel sleeve is released, said spring may force said brake piece as well as said steering wheel sleeve back to their original positions.

6. A children's mini-car comprising:
a front transverse rod having a pair of ends; a pair of inner and outer sleeves being received on each end of the front transverse rod, a brake system means for stopping movement of the mini-car; a rotational rear axle having a pair of ends; a respective toothed gear shaft being secured to each of the ends of the rear axle, so as to link each end of the rear axle to a corresponding rear wheel; a pair of double-sided gears, each double-sided gear being disposed on a respective toothed gear, i such a manner that said double-sided gear can transversely, slidably move along said toothed gear shaft, said double-sided gear being formed at one side with a recess; a gear shifting link mechanism being disposed between said front transverse rod and said rear axle; said link mechanism being secured to each respective double-sided gear for selectively, transversely, slidably moving said double-sided gear; said front transverse rod being supported on a pair of front hubs by a pair of L-shaped supporting rods, each of which is connected to a respective end of said front transverse rod; a frame being disposed on said front transverse rod to support a bottom plate of the car, each of said outer sleeves having a respective accelerator pedal mounted thereon and extending outwardly therefrom for concomitant rotational movement therewith and a respective pull rope fixing plate mounted thereon and extending outwardly therefrom for concomitant rotational movement therewith; each of said inner sleeves further being furnished with the brake system means; a pair of three-gear sets, each gear set including a respective forward inner gear, backward inner gear and idle gear; each of said gear sets being disposed between a respective pair of inner and outer frames, each of said outer protective frames being provided at the outer side thereof with a respective spring and at the inner side thereof with one of the respective forward inner gears; each of said inner protective frames being provided at the outer side thereof with a spring and at the inner side thereof with one of the respective backward inner gears; a respective idle gear being located between each of the respective pairs of said forward inner gears and said backward inner gears of each of the three gear sets, each of said idle gears being formed at both sides with a respective pair of supporting arms by which each of said idle gears is supported on both of the respective inner gears of each of the three-gear sets and the respective inner and outer protective frames between which each of the respective three-gear sets are disposed, such that each of the respective three-gear sets and the pair of protective frames between which it is disposed synchronously rotate; the double-sided gear further having a width corresponding to the sum of the width of any two of the forward inner gear, backward inner gear and idle gear of a respective three-gear set, such that sliding movement of the double-sided gear by the link mechanism engages one of either the said forward inner gear and the idle gear or the backward inner gear and the idle gear, so that rotational movement thereof is transferred to the toothed gear shaft and the rear axle via the double-sided gear; each of said springs being secured at a respective one end thereof to a respective corresponding outer protective frame and the respective other ends thereof being secured to said rear axle, each of said respective springs being locked to its position by a respective fixing pin; a respective pair of cables being disposed on each respective pair of inner and outer protective frames, the winding directions of said two cables of each respective pair being opposite to each other; said two cables intersecting and secured to each other at a predetermined location below said bottom plate of the car and said secured cables being further connected with a pull rope which is secured to a respective pull rope fixing plate, such that when said accelerator pedal is rotated forwardly, the respective sleeve and the pull rope fixing plate mounted thereon are rotated forwardly therewith and said inner and outer protective frames are rotated via the rotation of said outer sleeves associated with one of the respective pull rope fixing plates which pulls said pull rope and said cables, so as to twist said springs and further unwinding the cables from the protective frames, thereby rotating, respectively, the frames, the three-gear set disposed therein, the double-sided gear, the toothed gear shaft, the rear axle and the wheels carried thereon, such that the power resulting from the movement of the accelerator pedal and/or the pull rope fixing plate is transferred to move said rear wheels forward or backward depending on the engagement location of said double-sided gear; wherein a rear seat together with a backrest are detachably secured to said bottom plate of the car, such that said mini-car can serve as a drawing car by removing said rear seat as well as said backrest from said car.

7. A children's mini-car comprising:

a front transverse rotational axle having a pair of opposite ends;

a rear transverse rotational axle having a pair of opposite ends and further having a toothed portion defining a toothed gear shaft;

a pair of front wheels, each of said front wheels disposed on a respective opposite end of the front axle for rotational movement therewith;

a pair of rear wheels, each of said rear wheels disposed on a respective opposite end of the rear axle for rotational movement therewith;

a first sleeve rotatably received on the front axle for rotational movement thereabout;

an accelerator pedal mounted on the first sleeve and extending outwardly therefrom, whereby the application of force upon the accelerator pedal pivotably rotates said pedal and rotates the first sleeve therewith;

a rotational toothed transmission gear, said transmission gear disposed so that the teeth thereof mesh with the teeth of the toothed portion of the rear axle, whereby rotational movement of either one of the rear axle or the toothed transmission gear drives the other, said transmission gear further being transversely, slidably movable along the toothed portion of the rear axle, said transmission gear further having a width;

a three-gear set including a forward gear, a reverse gear and an idle gear therebetween, the gears of said three-gear set being axially aligned for rotational movement about the rear axle, the rotational movement of the forward gear being in a first forward direction, the rotational movement of the reverse gear being in a second reverse direction and the rotational movement of the idle gear being in both the forward and reverse directions, each of said gears having a width, the width of the transmission gear being greater than the width of any one of either the forward, reverse or idle gears, said width of the transmission gear further being less than the width of the idle gear combined with either the forward gear or the reverse gear, each of said gears having teeth that mesh with the teeth of the transmission gear, such that the rotational movement of either the forward and idle gears in the first forward direction is transmitted to the rear axle, whereby forward movement of the vehicle is provided or of the reverse and idle gears in the second reverse direction is transmitted to the rear axle, whereby reverse movement of the vehicle is provided;

means for transversely, slidably moving the transmission gear, such that the teeth of the said transmission gear mesh with the idle gear and with either the forward or reverse gears, whereby the direction of movement of the vehicle is selectively chosen;

a first rotational frame secured to the forward gear for rotational movement therewith in the first, forward direction and for rotational movement independently thereof in the second reverse direction;

a second rotational frame secured to the reverse gear for rotational movement therewith in the second reverse direction and for rotational movement independently thereof in the first forward direction;

a first drive cable having a first end secured to the first rotational frame, said first cable being wound in a first direction about the first rotational frame, such that forward movement of the first drive cable unwinds the first cable from the first frame rotating the first frame in the first forward direction;

a second drive cable having a first end secured to the second rotational frame, said second cable being wound in a second opposite direction about the second rotational frame, such that forward movement of the second drive cable unwinds the second cable from the second frame rotating the second frame in the second reverse direction;

the first and second drive cables each further having a second opposite end secured to either the first sleeve or the accelerator pedal, such that the application of forward force on the accelerator pedal pulls both the first and second cables forwardly, thereby unwinding both of said first and second cables from the first and second frames rotating the first frame and the forward gear associated therewith in the first forward direction, and further rotating the second frame and the reverse gear associated therewith in the second reverse direction;

resilient means for reversing the rotation of the first and second frames when the first and second drive cables are unwound therefrom, so that the cables are automatically rewound on the respective frame; and brake means for stopping the movement of the vehicle.

* * * * *

UNITED STATES PATENT AND TRADEMARK OFFICE
CERTIFICATE OF CORRECTION

PATENT NO.  : 4,790,552

DATED       : December 13, 1988

INVENTOR(S) : Hong R. Lian

It is certified that error appears in the above-identified patent and that said Letters Patent are hereby corrected as shown below:

Column 7, line 16, "cable" should read -- cables -- .

Column 8, line 41, -- corresponding outer protective frame and the respective -- should be inserted after -- respective -- and before -- outer -- .

Column 13, line 8, "i" should read -- in -- .

Signed and Sealed this

Eighteenth Day of April, 1989

Attest:

DONALD J. QUIGG

*Attesting Officer*    Commissioner of Patents and Trademarks